United States Patent Office 3,353,191
Patented Nov. 21, 1967

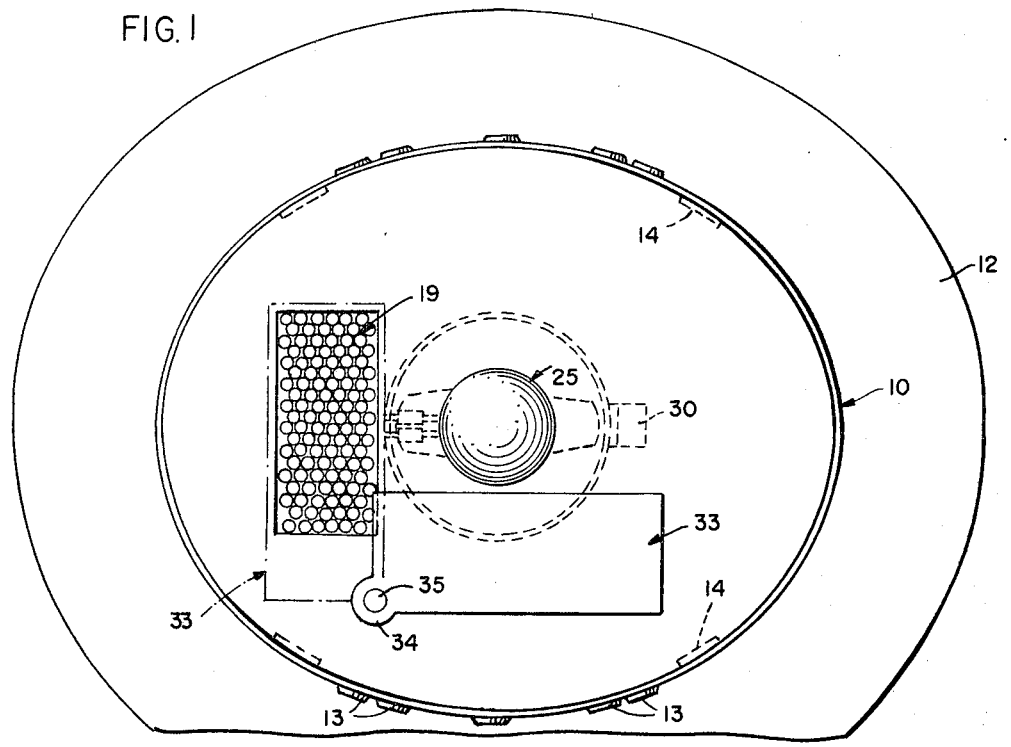
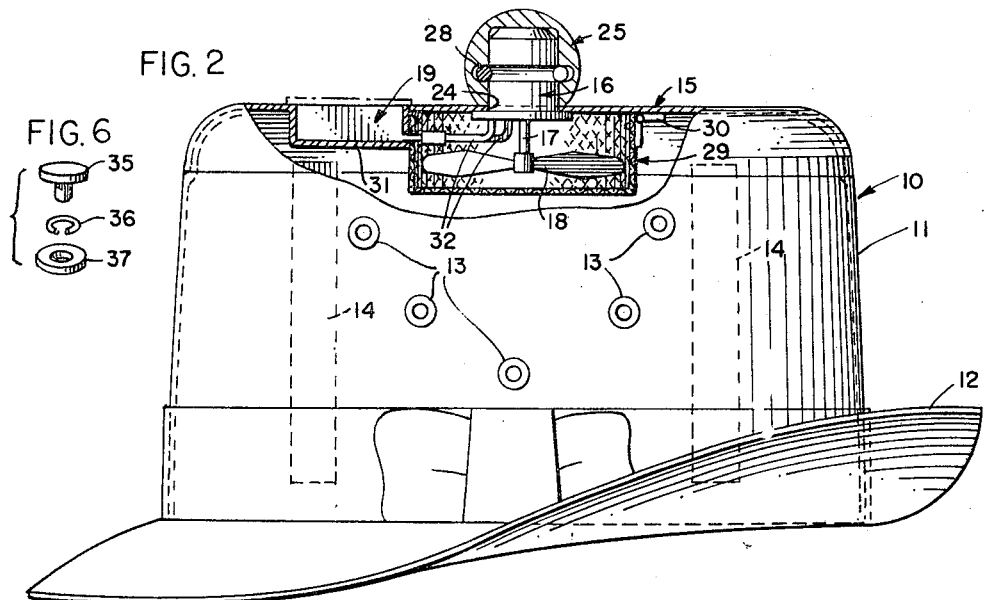
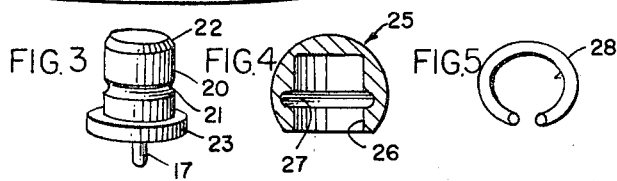

3,353,191
COOLING UNIT FOR A HAT
Harold W. Dahly, 4443 N. Greenview Ave.,
Chicago, Ill. 60653
Filed July 1, 1965, Ser. No. 468,848
1 Claim. (Cl. 2—171.3)

ABSTRACT OF THE DISCLOSURE

A hat and a cooling unit therefor including a motor operated fan mounted on the crown and a solar cell for driving the motor for circulating air within the hat.

---

This invention relates in general to a cooling unit for a hat for cooling the head of a person wearing a hat especially in warm climate areas, and more particularly to a self-powered cooling unit for a hat.

The cooling unit of the present invention includes a self-supporting plate adapted to be mounted in the crown of a hat during or after manufacture of the hat. A motor is mounted on the supporting plate and provided with a drive shaft extending at the underside thereof and having mounted thereon an air circulating means such as a fan or the like. A solar cell is mounted on the plate with its solar sensitive side available to receive solar energy. The solar cell is connected to the motor which is capable of being driven thereby to cause rotation of the fan. A cover plate is provided for variably exposing the solar side of the solar cell to solar energy for controlling the speed of the motor. The cover may even be fully extended over the solar cell to prevent operation and thereby stop the motor and fan. Screen means is provided to cover the area in which the fan rotates and prevent the head of a person from hampering the operation of the fan. The cooling unit, being mounted at the top of a crown of a hat, would by necessity require ventilating holes in the side of the crown to permit full air circulation.

The present invention is especially useful where the wearer of the hat desires head protection against the sun and where the temperature is such as to cause discomfort at the top of the head of the wearer. It is well known that cooling of the top of the head will have a cooling effect on the entire person, and further that when a hat is worn, extreme humid conditions exist between the top of the crown and the top of the head even if the hat may be provided with ventilating openings.

Therefore it is an object of the present invention to provide a new and improved cooling unit for a hat.

Another object of this invention is in the provision of a cooling unit for a hat capable of properly conditioning the air between the top of the head and the top of the crown, especially when the wearer is in a warm climate.

Still another object of this invention resides in the provision of a cooling unit for a hat that is self-powered, may be easily and inexpensively manufactured, and will have long life.

A further object of this invention is to provide a cooling unit for a hat capable of being built into the hat when the hat is manufactured or added to an already existent hat, which includes a motor and fan operated by a solar cell unit.

Other objects, features and advantages of the invention will be apparent from the following detailed disclosure, taken in conjunction with the accompanying sheet of drawings, wherein like reference numerals refer to like parts, in which:

FIG. 1 is a top plan view of a hat embodying the present invention, showing some parts in phantom for clarity;

FIG. 2 is a side elevational view of a hat having the present invention mounted thereon, and with parts cut away and parts in section for purposes of clarity;

FIG. 3 is a perspective view of the electric motor that is employed in the cooling unit of the present invention;

FIG. 4 is an axial sectional view taken through the clamp that serves to fix the motor to the supporting plate;

FIG. 5 is a perspective view of a split retaining ring; and

FIG. 6 is an exploded perspective view of a fastening means for mounting the solar cell cover on the supporting plate.

Referring now to the drawings, the cooling unit of the present invention is shown in FIGS. 1 and 2 as being mounted in the top of a hat 10 having a crown 11 and a brim 12. Ventilating holes 13 may be provided in the side wall of the crown, and in order to assure supporting of the cooling unit without crumbling of the crown, a plurality of suitable staves 14 may extend upwardly along the side wall of the crown. It will be appreciated that the hat may be of any suitable material, such as felt or straw, and that the cooling unit may be easily mounted on an existent hat or mounted on a hat during its manufacture.

The cooling unit includes generally an inverted, dish-shaped, supporting plate 15 having a motor 16 mounted thereon with a drive shaft 17 having a fan or air circulating means 18 on the shaft, and a solar cell 19 also carried on the supporting plate.

The electric motor 16 is one capable of being driven by a solar cell of any desired type and is provided with a generally cylindrical body 20 having an annular groove 21 between its upper and lower ends, a beveled surface 22 at the upper end, and a radial flange 23 at the lower end. An opening 24 is provided in the supporting plate 15 at about the center thereof and through which the cylindrical body 20 of the motor would be inserted when mounting the motor on the supporting plate. The motor would be positioned so that the flange 23 abuts up against the underside of the supporting plate.

In order to secure the motor in place on the supporting plate, a spherically-shaped clamping member 25 is provided that includes a hollow bore 26 of a slightly greater dimension than the cylindrical body 20 of the motor and therefore telescopically received over the motor as shown in FIG. 2. An annular groove 27 is formed in the wall of the bore 26 for receiving a split resilient retaining ring 28 that expands into the groove 27 upon application of the clamping member 25 over the upper end of the motor 16. The beveled edge 22 aids in facilitating the spreading of the retaining ring 28 to a full open position so that it may slide across the cylindrical body 20 of the motor. When the clamping member and ring has bottomed against the upper side of the supporting member, the split ring 28 will contact into the groove 21 of the motor. The depth of the groove 21 is such that the ring cannot fully contract thereinto, and therefore the ring extends beyond the cylindrical surface of the motor and partially into the groove 27 of the clamping member 25 to thereby lock the clamping member onto the motor and the motor in place on the supporting plate 15. The clamping member 25 being spherical serves somewhat as an ornament on the top of the hat and may be painted any desirable, attractive color.

After the motor has been mounted in place on the supporting plate, it is seen that the drive shaft 17 extends well below the underside of the supporting plate, and the fan 18 may then be mounted thereon as shown in FIG. 2. For preventing interference with the rotation of the fan 18, a generally cup-shaped screen member 29 is mounted over the fan and by a spring hinge 30 that enables the screen to be swung downwardly for permitting access to the fan and also to facilitate mounting of the motor and fan on the supporting plate.

The solar cell 19 may be mounted in any desired manner on the supporting plate 15, and in this instance is shown as being mounted in a recess 31 formed in the plate so that the outer solar sensitive surface is substantially contiguous with the upper side of the supporting plate 15. Connecting wires 32 are provided to electrically connect the solar cell to the motor. Thus, solar energy impinging on the solar cell will cause operation of the motor 16 and rotation of the fan 18 to circulate the air between the top of the crown and the head of the wearer.

In order to control the speed of the motor 16 or to completely shut off the motor, a cover 33 is mounted on top of the supporting plate for swinging movement partially over the solar cell, completely over the solar cell, or completely off the solar cell. The cover is substantially rectangular and provided with an apertured enlargement 34 at one corner to receive a rivet 35 that extends also through the supporting plate and is fastened to the supporting plate by the usual spreading means. Further, a wave washer or the like 36 and a plain washer 37 is provided at the head of the rivet 35 to define a frictional connection so that the cover will remain in any adjusted position.

It will be understood that modifications and variations may be effected without departing from the scope of the novel concepts of the present invention, but it is understood that this application is to be limited only by the scope of the appended claim.

The invention is hereby claimed as follows:

In combination with a hat having a brim and open-top crown, a cooling unit comprising an inverted dish-shaped supporting plate mounted on said crown, a recess in said plate, a solar cell mounted in said recess, a solar cell operable motor electrically connected to said solar cell mounted on said plate having a drive shaft extending to the underside thereof, a fan mounted on said drive shaft for corotation therewith, displaceable cup-shaped screen means at the underside of the plate for enclosing said fan, and cover means mounted on the upper side of said plate for variably exposing said solar cell to control the speed of the motor.

References Cited

UNITED STATES PATENTS

| | | | |
|---|---|---|---|
| 432,728 | 7/1890 | Eliel | 2—171.3 |
| 735,790 | 8/1903 | Meerza | 2—171.3 |
| 737,373 | 8/1903 | Eagle et al. | 2—5 X |
| 2,951,163 | 8/1960 | Shaffer et al. | 136—89 X |
| 3,168,748 | 2/1965 | Limberg | 2—171.3 |

PATRICK D. LAWSON, *Primary Examiner.*

G. KRIZMANICH, *Assistant Examiner.*